No. 807,625. PATENTED DEC. 19, 1905.
J. A. LYNN.
MACHINE FOR MAKING DECORATIVE ROPE.
APPLICATION FILED NOV. 11, 1903.
2 SHEETS—SHEET 1.
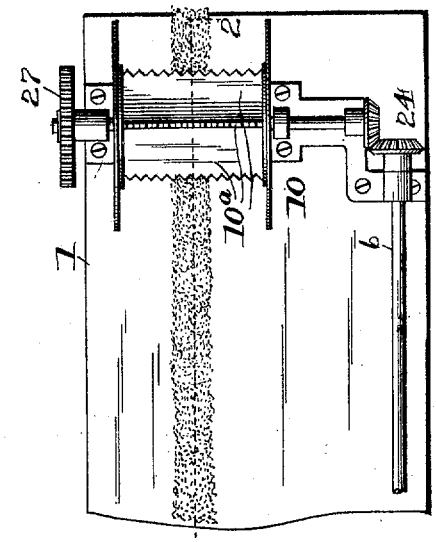
Fig. 1.
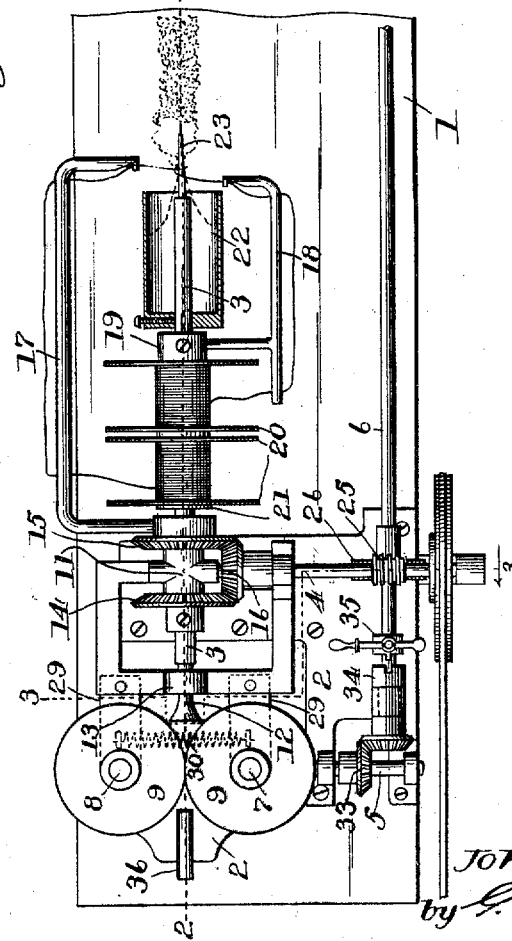
Fig 5.
Witnesses:—
C. H. Crawford
Leon Stroh
Inventor:—
John A. Lynn
by G. L. Cragg
his Attorney No. 807,625. PATENTED DEC. 19, 1905.
J. A. LYNN.
MACHINE FOR MAKING DECORATIVE ROPE.
APPLICATION FILED NOV. 11, 1903.
2 SHEETS—SHEET 2
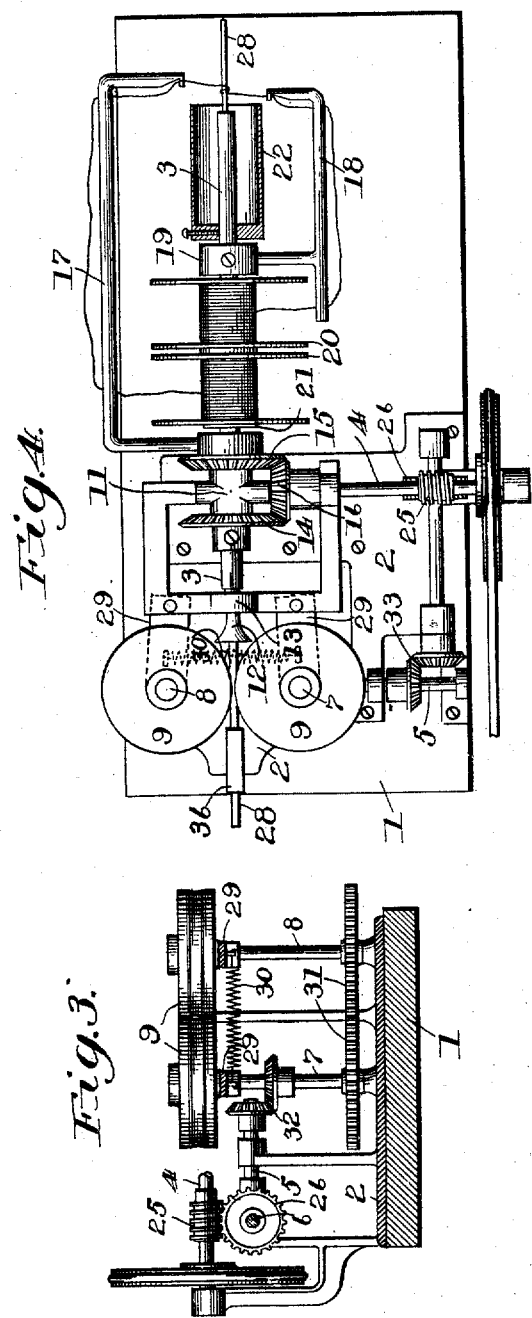
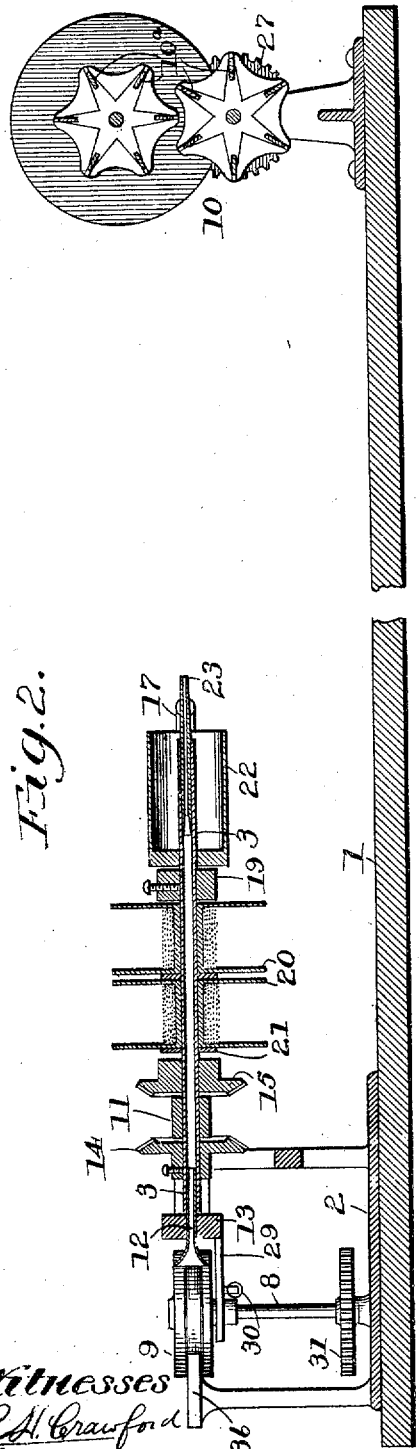
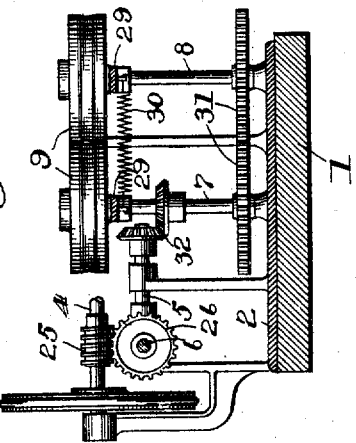
Witnesses
C. H. Crawford
Leon Stroh
Inventor:—
John A. Lynn
by George L. Cragg
his Attorney

UNITED STATES PATENT OFFICE.

JOHN A. LYNN, OF CHARLEVOIX, MICHIGAN.

MACHINE FOR MAKING DECORATIVE ROPE.

No. 807,625.  Specification of Letters Patent.  Patented Dec. 19, 1905.

Application filed November 11, 1903. Serial No. 180,711.

*To all whom it may concern:*

Be it known that I, JOHN A. LYNN, a citizen of the United States, residing at Charlevoix, in the county of Charlevoix and State of Michigan, have invented a certain new and useful Improvement in Machines for Making Decorative Rope, of which the following is a full, clear, concise, and exact description, reference being had to the accompanying drawings, forming a part of this specification.

My invention relates to machines for making decorative rope for ornamental uses from tufts of lacolocium, ground pines, or the leaves of holly and like material, the same being formed into wreaths or chaplets or festooned in garlands for interior and exterior decoration, and said machine has for its salient features—

First, the provision of a binder mechanism and binder cord or wire whereby the stems of each tuft of the lacolocium, ground pine, or other material are united one to the other in a manner to form long or short strips of decorative rope of a generally cylindric formation and substantially uniform contour. Said binder also provides means whereby said rope may be provided with a longitudinal support in the form of a centrally-disposed wire or cord in cases where the span of rope forming a garland or like form of decoration is of unusual length.

Second, the provision of a removable mandrel whereon the tuft-stems of the material are bound together, said mandrel forming a projection with a fixed location and constituting a form for the material during the operation of binding said stems together, said mandrel being desirably removed when the machine is employed in the production of a different product.

Third, the provision of a binder whereby instead of uniting the tuft-stems to each other the same may be bound about a centrally-disposed reed of ratan or other suitable flexible rod when it is desired to form a wreath or like ornamental fixture and provide the same with a frame structure in order that said wreath may retain its form.

Heretofore the production of decorative rope by hand has been accompanied by a certain disadvantage peculiar to handwork, such as irregularity of size, caused by unequal distribution of the tufts during the operation of forming the rope. A further disadvantage is experienced when light, medium, and heavy grades of rope are desired. A careless former may use as much stock in the production of a light grade as should be used in the heavy grade, or vice versa, making it difficult to distribute the proportionate amount of stock to the various grades of rope.

There enters into the binder construction a rotating shaft desirably having an axial bore throughout its length. Said shaft is driven from a suitable source of power and desirably carries oppositely-rotating binding-arms, which direct a binder cord or wire in the operation of twining the same about the tuft-stems of the decorative material, preferably in opposite directions. The operating-shaft preferably carries bobbins from which the cord or wire is supplied to the rotating binding-arms. A suitable tension is also provided to retard the rotation of said bobbin to effect a winding of the cord or wire around the tuft-stems that will insure a firm unity thereof.

In the second feature of my invention means are provided whereby the stems of the tufts to be bound are maintained in a fixed position with respect to the revolving binding-arms. Said means consists of a form on which the stems and wire operate to effect the formation of the rope. Said form in the preferred construction consists of a mandrel located centrally with respect to the axis of rotation of the binding-arms. The tuft-stems are laid upon the mandrel by hand, and the binding-arms tightly wind the binding-cord or wire about the tuft-stems and mandrel. As the formation of the rope is gradually completed the same is drawn off from the end of the mandrel, whereupon the space occupied by said mandrel is filled by or taken up by the expansion of the stems caused by the reduction of pressure thereon from the binding-wire. A windlass or take-off device is provided for effecting the gradual removal of the rope from the end of the mandrel as the same is completed. Said device consists of oppositely-rotating members of a windlass, which performs the dual function of a feed and take-off device when decorative rope is being made. Said binder is also desirably provided with a suitable guard to prevent the unwieldy ends of tuft-stems from projecting outwardly and forming defective portions on the peripheral surface of the decorative rope.

In the third feature of my invention, wherein the tuft-stems are bound around a ratan, reed, or like flexible rod, the mandrel may be removed, as the reed not only forms the mandrel in the operation of making the wreath or other ornamental formation, but also forms the frame structure of said wreath. The feed mechanism in this form of device preferably consists of spring-controlled rollers loosely mounted in suitable bearings and driven from a source of power common to the mechanism.

I will now describe my invention with reference to the accompanying drawings, showing the preferred embodiment thereof, in which—

Figure 1 is a plan view of a machine embodying the main features of my invention. Fig. 2 is a longitudinal sectional view thereof on line 2 2 of Fig. 1. Fig. 3 is a sectional view on line 3 3 of Fig. 1. Fig. 4 is a plan elevation of a modified form of the device. Fig. 5 is a detail view showing the manner of assembling the tufts.

Like parts are indicated by similar characters of reference throughout the drawings.

In the drawings the device is shown mounted upon a base 1. A casting 2, secured to the upper face of the base at one end thereof, is provided with vertical arms on which is mounted a suitable frame having bearings for the rotating shafts 3, 4, 5, and 6, together with bearings for the vertical shafts 7 and 8 of the adjustable feed-rollers 9 of the binder device. The shaft 4 in the preferred form constitutes the main driving-shaft from which the various operative parts of the device are driven. A suitable form of windlass or take-off device 10 is mounted on one end of the base, preferably remote from the binder apparatus and in alinement with certain parts thereof to coöperate with said binder when the same is employed in making decorative rope.

The operating-shaft 3 is desirably horizontally disposed in a bearing 11, one end operating in a sleeve 12, secured in a bearing 13, while the opposite end of said shaft 3 overhangs the base from the bearing 11 inwardly. The shaft 3 is provided with a beveled gear 14, secured thereto and desirably located near the bearing 11. Another and like gear 15 is loosely mounted on said shaft and is located, desirably, on the opposite side of the bearing 11. The working faces of said gears in the preferred form are arranged to face each other. Said gears coöperate with a third gear 16, mounted on the main shaft 4, which is adapted to be in permanent mesh with said gears 14 and 15 to rotate the same in opposite directions and preferably at a uniform speed. A binding-arm 17 is secured to the hub of the beveled gear 15 and rotates therewith in a given direction. A coöperating binding-arm 18 is shown secured to a collar 19, which is rigidly mounted on the shaft 3 and rotates therewith in a given direction. The arm 7, being operated by the gear 15 is rotated in an opposite direction to the arm 18, which is mounted on the shaft 3, operated by the gear 14. Suitable bobbins 20 are desirably loosely mounted on the shaft 3 between the collar 19 and the gear 15, said bobbins being provided to contain the binding cord or wire and supply the same to the binder-arms 15 and 16. When the machine is in operation, it is necessary to retard the movement of said bobbins to cause the cord or wire to be taut when it is supplied to the binding-arms. The tension of the bobbins is effected by securing the collar 19 close to the inner bobbin 20 and forcing the same into engagement with a collar located between said bobbins 20 and a stationary stop 21, positioned near the gear 15. This frictional engagement of the parts retards the unwinding action of the bobbins to cause a pressure of the binding action of said wire upon the tuft-stems of the decorative material. Said shaft 3 is provided with a hollow cylindric guard 22, desirably removably secured to said shaft and located adjacent to the collar 19, the skirt of said guard preferably projecting slightly beyond the extreme end of the shaft 3. Said shaft 3 is further provided throughout its entire length with an axial bore adapted to permit the passage of a sustaining cord or wire for long lengths of rope and also to accommodate a reed when the device is employed in the manufacture of wreaths. On the inner end of the shaft 3 a mandrel 23 is desirably removably secured and projects when in place slightly beyond the skirt of the guard 22, the outer end being preferably tapered.

The windlass or take-off device 10 is desirably composed of two oppositely-rotating rollers having web-like blades 10$^a$ attached at either end to suitable flanges. Said rollers are preferably mounted on horizontal shafts journaled in suitable bearings and geared, as shown, to operate in opposite directions. One of said rollers is preferably driven from miter-gears 24, one gear of which is secured to one of the roller-shafts, while the other is mounted on shaft 6, which is geared to the main driving-shaft 4 by a worm 25 and a gear 26, as clearly shown in Figs. 1 and 3. Said roller-shafts are geared to each other by gear-wheels 27, which maintain a fixed rotative relation with respect to each roller.

The attachments of the binder employed in the manufacture of decorative rope having been described, I will now explain the devices utilized in connection with said binder in making decorative wreaths or other ornamental formation having a frame structure.

The tuft-stems are bound upon ratan reeds or stems in order that the wreath or other ornamental formation may retain its shape. Therefore the mandrel 23 is removed from the end of the shaft 3, and the reed 28 is fed through the shaft, (see Fig. 4,)

the projecting end of the reed forming a mandrel about which the tufts are bound. Said feeding mechanism in the preferred form consists of two spring-pressed rollers 9 9, desirably provided with peripheral grooves in the working faces to engage the reed and feed the same into the axial bore of the shaft 3. Said reeds 28 are supplied in sections of the required length and are fed into the machine end to end, the finished products being removed from the binder by hand. The feed-rollers 9 9 are preferably mounted on shafts 7 and 8, which are loosely supported in sockets on the casting 2 at their lower ends and are provided at the opposite ends near the rollers with bearings 29, pivoted to the supporting-frame in which the bearings for the operative shafts are located. Said pivoted bearings 29 are provided with lugs to which the ends of a contractile spring 30 are secured, maintaining said rollers in frictional engagement. The feed-shafts 7 and 8 are provided near their lower ends with gears 31, which operate said rollers in opposite directions. Shafts 7 and 5 are connected with miter-gears 32, and shaft 5 is geared to shaft 6 by miter-gears 33. The gear mounted on shaft 6 is provided with a notched sleeve 34, forming one of the members of the clutch mechanism 35 to permit the feed-rollers to be thrown into and out of operation, as desired. In order to insure the insertion of the reed 28 into the axial bore of the shaft 3, the sleeve 12, in which one end of said shaft 3 has a bearing, is flared to guide the reed from the grooved rollers 9 into said shaft 3. It may be further desirable to provide a guide 36 to aid the operator in feeding the reeds 28 toward the rollers, so that said reeds will engage the peripheral grooves and not the flat faces of said rollers.

In Figs. 1, 2, and 3 a machine is illustrated which is capable of making decorative rope, wherein a mandrel is employed on which the rope is formed and which is also capable of making wreaths or other forms wherein a frame is employed on which to bind the tufts. In Fig. 4 a modification is shown adapted to fulfil the requirements of making wreaths. This form is not provided with a take-off mechanism, as in the preferred construction, as the finished product of this machine will be comparatively short in length and may be removed by hand. It will be understood in the operation of this device that the speed of the machine is changed when different grades of rope are desired, so that in making all grades the operator lays each tuft of the material on the mandrel or reed at approximately a given speed, a high speed producing a product of a light grade, a medium producing a medium grade, and a slow speed a heavy grade, the grade being dependent on the rapidity with which the completed product is removed from the binding-spindle. Various means may be employed for effecting the different speeds; but I preferably employ a number of worms 25, the pitch of each worm operating the feed and take-off mechanism at the desired speed without altering or changing the speed of the binder.

It will be noted that the binding of the product is effected by twining the wire about the tuft-stems of the decorative material in opposite directions. When garlands of unusual length are suspended on the exterior of a building, the action of the wind causes great strain upon the decorative rope, often a twisting strain. The opposite twining of the cord or wire resists any twisting or torsional strains in any direction, whereas a single wire wound about the stems spirally would unwind as a result of a twisting action opposite to the direction of the spiral wind, allowing tufts of the decorative material under wind-pressure to become disengaged from the binding-wire, and thereby impairing the rope formation.

It is obvious that changes may be made in the embodiment of the invention herein shown and described without departing from its spirit, and I do not wish to be limited to the precise construction illustrated; but, Having described my invention, what I claim, and desire to secure by Letters Patent, is the following:

1. A binding mechanism including an operating-shaft having an axial bore throughout its length and carrying a loosely-mounted bevel-gear and a fixedly-mounted bevel-gear, a driving-gear in mesh with said loosely and fixedly mounted gears to effect the operation of the same in opposite directions, a binding-arm mounted on said shaft to rotate therewith, a binding-arm secured to said loosely-mounted gear to rotate therewith in an opposite direction to the rotation of the coöperating arm, a bobbin for each arm loosely mounted on said operating-shaft to supply binder cord or wire to said arm, means for checking the unwinding action of said bobbins to effect a tension on the binding cord or wire, a mandrel located at the axis of rotation of said arms and removably secured to said operating-shaft, said mandrel constituting a form around which the decorative material is placed and bound together by the wire issuing from the adjacent ends of the binder-arms, a guard mounted on said operating-shaft to contain the free ends of the decorative material during the process of forming the product, a take-off mechanism or windlass adapted to coöperate with said binder to effect the progressive withdrawal of the product from the binder as the same is finished, a feed mechanism adapted to feed reeds or like material to the bore of said operating-shaft to effect the incorporation of said reed in the production of certain of the products of the mechanism, and a clutch mechanism adapted to throw said feed mechanism into and out of gear with the binder mechanism, substantially as described.

2. A binding mechanism including an operating-shaft thereof, having a fixedly-mounted gear and a loosely-mounted gear, a driving-gear in mesh with said fixedly-mounted and loosely-mounted gears to effect the rotation of the same in opposite directions, coöperating binding-arms, one of said arms being mounted on said operating-shaft to rotate therewith, the other of said binding-arms being secured to said loosely-mounted gear to effect the operation of said arms in opposite directions, a bobbin for each arm mounted on said operating-shaft adapted to supply said arm with binder cord or wire, means for checking the unwinding action of said bobbins to effect a tension on the binding cord or wire, a mandrel located at the axis of rotation of said arms and removably secured to said operating-shaft, said mandrel constituting a form around which the product is set up and adapted to be bound by the wire or cord issuing from adjacent ends of the binder-arms, and a take-off mechanism adapted to coöperate with said binder to effect the withdrawal of the product from the mandrel as said product is finished, substantially as described.

3. A binding mechanism including an operating-shaft driven in a given direction, a pair of coöperating binding-arms rotated in opposite directions, means for supplying said arms with binder cord or wire, a tension device to check the speed of the wire to the binding-arms, a mandrel about which the binding-arms rotate, said mandrel constituting a form about which the product is set up, a hollow cylindric guard secured to said operating-shaft surrounding the same and adapted to project toward the path of rotation of the binding-arms to contain the free ends of the decorative material during the operation of forming the product, substantially as described.

4. A binding mechanism including an operating-shaft driven in a given direction, a pair of coöperating binding-arms rotated in opposite directions, means for supplying said arms with binder cord or wire, a tension device to check the speed of said wire to the binding-arms, said arms and cord or wire effecting the unity of the decorative material into a finished product, and a hollow cylindric guard mounted upon said operating-shaft, surrounding the same and adapted to project toward the path of rotation of the binding-arms to contain the free ends of the decorative material during the operation of forming the product, substantially as described.

5. A binding mechanism including an operating-shaft driven in a given direction, a pair of coöperating binding-arms rotated in opposite directions, means for supplying said arms with binder cord or wire, a tension device to check the speed of the wire to the binding-arms, a mandrel about which the binding-arms rotate, said mandrel constituting a form about which the product is set up, a hollow cylindric guard secured to said operating-shaft surrounding the same and projecting toward the path of the ends of the binding-arms to contain the free ends of the decorative material during the operation of forming the product, substantially as described.

6. A binding mechanism including an operating-shaft driven in a given direction, a pair of coöperating binding-arms rotated in opposite directions, means for supplying said arms with binder cord or wire, a tension device to check the speed of said wire to the binding-arms, said arms and cord or wire effecting the unity of the decorative material into a finished product, and a hollow cylindric guard mounted upon said operating-shaft, surrounding the same and projecting toward the path of the ends of the binding-arms to contain the free ends of the decorative material during the operation of forming the product, substantially as described.

7. A binding mechanism including an operating-shaft therefor, binding-arms adapted to rotate about said shaft, means for supplying said arms with binder cord or wire, means for checking the speed of the wire to said arms, a mandrel constituting a form around which the product is set up and bound together by the binder cord or wire issuing from the binder-arms, and a guard adapted to contain the free ends of the decorative material during the operation of forming the product, substantially as described.

8. A binding mechanism including an operating-shaft therefor, binding-arms adapted to rotate about said shaft, means for supplying said arms with binder cord or wire, said arms and cord or wire effecting the unity of the decorative material into a finished product, and a guard adapted to contain the free ends of the decorative material during the operation of forming the product, substantially as described.

9. A binding mechanism including a single operating-shaft, a binding-arm fixed on said shaft to rotate therewith, a binding-arm loosely mounted on said shaft, means for rotating said arms in opposite directions, bobbins mounted on said shaft supplying said binder-arms with binding-cord, mechanism whereby said bobbins effect a tension on said binding-arm, and a guard mounted on said operating-shaft containing the free ends of the decorative material during the operation of forming the same into a product, substantially as described.

10. A binding mechanism including a single operating-shaft, a binding-arm fixed on said shaft to rotate therewith, a binding-arm loosely mounted on said shaft, means for rotating said arms in opposite directions, a mandrel constituting a form about which the product is set up, and a guard containing the free ends of the decorative material during the operation of forming the same into a product, substantially as described.

11. A binding mechanism including a single operating-shaft, a binding-arm fixed on said shaft to rotate therewith, a binding-arm loosely mounted on said shaft, means for rotating said arms in opposite directions, and a guard containing the free ends of the decorative material during the operation of forming the same into a product, substantially as described.

In witness whereof I hereunto subscribe my name this 4th day of November, A. D. 1903.

JOHN A. LYNN.

Witnesses:
CARL H. CRAWFORD,
LEON STROH.